United States Patent [19]

Lauhoff et al.

[11] 4,417,654

[45] Nov. 29, 1983

[54] TENSIONING DEVICE FOR A VERTICAL CONVEYOR

[75] Inventors: Heinz Lauhoff, Beckum; Alfons Bökamp, Oelde-Stromberg, both of Fed. Rep. of Germany

[73] Assignee: Bernhard Beumer Maschinenfabrik KG, Beckum, Fed. Rep. of Germany

[21] Appl. No.: 262,476

[22] Filed: May 11, 1981

[30] Foreign Application Priority Data

May 10, 1980 [DE] Fed. Rep. of Germany ....... 3017969

[51] Int. Cl.³ .............................................. B65G 23/44
[52] U.S. Cl. .................................................... 198/815
[58] Field of Search ................ 198/815, 816; 474/132, 474/133, 112

[56] References Cited

U.S. PATENT DOCUMENTS

| | | | |
|---|---|---|---|
| 1,385,942 | 7/1921 | Goddard et al. | 474/132 |
| 1,387,849 | 8/1921 | Grass | 474/132 |
| 1,652,799 | 12/1927 | Roberts | 474/132 |
| 1,925,024 | 8/1933 | Slater | 198/816 |
| 1,934,481 | 11/1933 | Beyl | 198/816 |

*Primary Examiner*—Jeffrey V. Nase
*Assistant Examiner*—Dennis J. Williamson
*Attorney, Agent, or Firm*—Spencer, Kaye & Frank

[57] ABSTRACT

A vertical conveyor comprises a driving drum; a tensioning drum spaced vertically from the driving drum and supported shiftably for varying its distance from the driving drum; a vertically oriented endless carrier trained about the driving drum and the tensioning drum; a tensioning weight situated spaced from and in vertical alignment with the tensioning drum; and coupling elements situated between and in vertical alignment with the tensioning weight and the tensioning drum. The coupling elements are secured to the tensioning weight and to the tensioning drum for directly transmitting forces from the tensioning weight to the tensioning drum urging the tensioning drum vertically away from the driving drum, whereby the endless carrier is tensioned. The conveyor further has a support frame situated between the tensioning weight and the tensioning drum and supports the coupling elements; a support shaft horizontally spaced from the coupling elements; and levers mounted on the support shaft and connected to the coupling elements for operatively connecting the support shaft with the coupling elements.

13 Claims, 9 Drawing Figures

FIG. 3
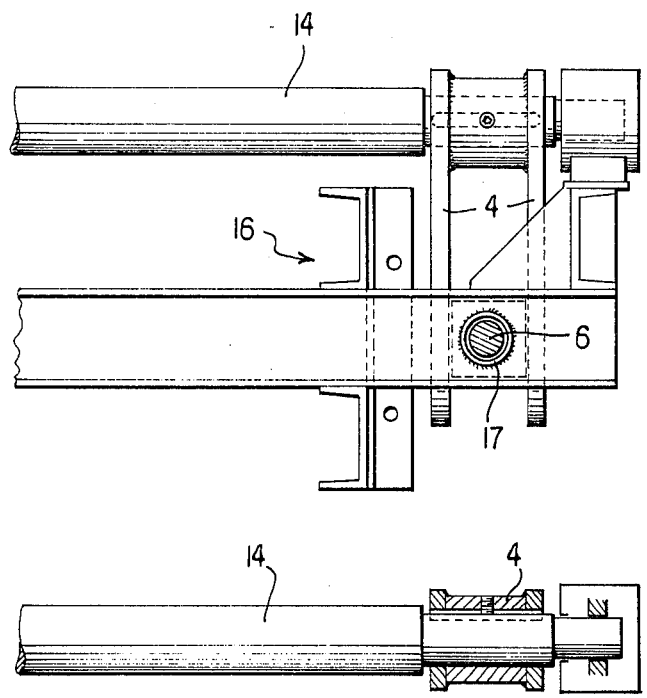
FIG. 4
FIG. 5
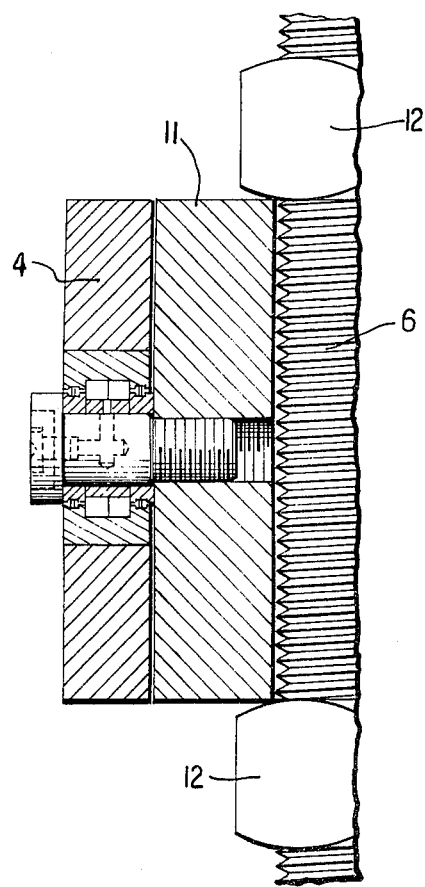

TENSIONING WEIGHT

TENSIONING DEVICE FOR A VERTICAL CONVEYOR

BACKGROUND OF THE INVENTION

This invention relates to a tensioning device for tensioning the carrier of a vertical conveyor, particularly a bucket conveyor. The carrier, on which the buckets are usually equidistantly mounted, is an endless chain, or cable or strap structure trained, at opposite longitudinal ends of the conveyor, about two end drums. One of the end drums is a driving drum rotated by a power drive, while the other end drum is a tensioning drum which is shiftable towards and away from the driving drum for appropriately tensioning the carrier. The force generating component of the tensioning device may comprise a tensioning weight which exerts a force on the tensioning drum in a direction oriented away from the driving drum and which cooperates with two tensioning levers. Generally, a resilient tensioning force is transmitted to the shaft of the tensioning drum by means of tensioning spindles arranged on either side of the tensioning drum. In case the force-generating device is a weight, the latter may be arranged between the two spaced, upright ducts in which the carrier circulates with the buckets. The tensioning weight, with the intermediary of a connecting element (such as the tensioning spindles acting as pressure bars) arranged between the tensioning weight and the tensioning drum, tensions the carrier by shifting the tensioning drum into its operating position parallel to the length of the bucket conveyor in a direction away from the driving drum.

The above-outlined known tensioning devices have the disadvantage that the tensioning drum cannot be shifted parallel to its initial position during the tensioning step. If the tensioning drum shaft assumes an oblique position relative to its aligned, initial position prior to applying the tensioning force, the carrier will not run in a satisfactory manner; in case of such an oblique positioning of the tensioning drum axis, the carrier—particularly if it is a strap—has the tendency of running off the tensioning drum. It is a further disadvantage of the above-outlined prior art arrangements that in case of an elastic tensioning of the carrier, an automatic follow-up movement cannot be effected if an elastic or, in particular, a permanent elongation of the carrier occurs. As a consequence, the carrier, after a certain service period, becomes slack if the carrier tension is not continuously and periodically verified and adjusted and thus a slippage between the carrier and the driving drum may occur which leads to a significant wear and also results in an unsatisfactory guidance of the carrier.

Further, a spring bias achieved with the above-outlined prior art tensioning devices is not capable of equalizing length differences of the carrier; such length differences may occur, for example, because of non-uniform elongations of the carrier along its width and/or non-uniform elongations of the upright ducts.

While the above-outlined disadvantages can be eliminated in a large measure in a tensioning device which is equipped with a tensioning weight, during tensioning such weight-type tensioning devices nevertheless often lead to significantly greater misalignments and oblique positioning of the tensioning drum than elastic (spring operated) tensioning devices. In order to eliminate such an unsatisfactory operation, there has been developed a tensioning device which has two tensioning levers arranged essentially perpendicularly to the length dimension of the bucket carrier. One end of each tensioning lever engages the shaft of the tensioning drum, while the respective other ends are articulated to a shaft supported by appropriate bearings in the conveyor housing. Such a known tensioning device has a number of significant drawbacks.

It is first noted that the last-mentioned tensioning device is not adapted for installation between the two upright ducts; it must be arranged at the foot structure of the bucket conveyor system. Such a foot structure is substantially wider than the available space between the upright ducts. This circumstance has, among others, the disadvantage that it is practically not feasible to equip an already-existing bucket conveyor with such a known tensioning device.

It is a further disadvantage of the last-mentioned known tensioning device that during the tensioning step the tensioning drum must move along a circular arc whose radius corresponds essentially to the length of the tensioning lever, that is, to the distance between the tensioning drum axis and the shaft which supports the tensioning lever. Such a motion of the tensioning drum away from the line of alignment with regard to the axis of the driving drum is very disadvantageous. The shorter the length of the tensioning lever, the greater the deviation from the aligned position.

It is a further disadvantage of the last-named tensioning device that it permits only a limited readjustment and further, in case of relatively large elongations of the carrier (which occur particularly in case of bucket conveyors of great length and, dependent upon the carrier material may be particularly significant, for example, in case of certain straps), the known tensioning device is no longer in a position to take up in an operationally satisfactory manner the elastic and permanent elongations or expansions of the bucket carrier.

SUMMARY OF THE INVENTION

It is an object of the invention to provide an improved tensioning device of the above-outlined type from which the discussed and other disadvantages are eliminated and which may be arranged between the upright ducts of the bucket conveyor without difficulties thus making possible to subsequently equip already-existing bucket conveyors with the tensioning device.

It is a further object of the invention to provide an improved tensioning device of the above-outlined type which is capable of taking up substantial elongations (expansions) of the carrier and wherein the tensioning drum, even with applied tension, substantially remains in alignment with the driving drum and changes its positions exclusively linearly, parallel to its initial position.

These objects and others to become apparent as the specification progresses, are accomplished by the invention, according to which, briefly stated, the vertical conveyor comprises a driving drum; a tensioning drum spaced vertically from the driving drum and supported shiftably for varying its distance from the driving drum; a vertically oriented endless carrier trained about the driving drum and the tensioning drum; a tensioning weight situated spaced from and in vertical alignment with the tensioning drum; and coupling elements situated between and in vertical alignment with the tensioning weight and the tensioning drum. The coupling elements are secured to the tensioning weight and to the tensioning drum for directly transmitting forces from the tensioning weight to the tensioning drum urging the tensioning drum vertically away from the driving drum, whereby the endless carrier is tensioned. The conveyor further has a support frame situated between the tensioning weight and the tensioning drum and supports the coupling elements; a support shaft horizontally spaced from the coupling elements; and levers mounted on the support shaft and connected to the coupling elements for operatively connecting the support shaft with the coupling elements.

In contradistinction to the earlier-discussed known tensioning device, according to the invention the end portions of the levers which serve as a support and which are oriented away from their pivot shaft, do not engage directly the tensioning drum shaft, but are connected to a coupling element which extends between the tensioning drum shaft and the tensioning weight and which is preferably situated between the tensioning weight and the tensioning drum. According to a preferred embodiment of the invention, the tensioning weight is arranged between the tensioning drum and the driving drum and thus is situated between the two upright ducts of the bucket conveyor.

The coupling element is preferably formed as a threaded spindle as a whole, or at least in the zone where it engages the levers. In the zone of the threaded portion, the coupling element is provided with pins which extend in a plane that is parallel to the tensioning drum axis.

The threaded portion of the coupling element is provided with nuts on both sides of the pins. In such an arrangement it has been found to be particularly advantageous to provide that the threaded portion extends through a frame provided with a guide.

The levers are, at their ends which are oriented away from the coupling element, mounted separately on the lever shaft so that each lever may be separately and individually set and immobilized at its connection with the lever shaft.

At those end portions which are oriented towards the coupling element, the levers are expediently provided with a slot whose width corresponds to the diameter of the pins so that the pins, upon a change of the angular position of the levers, may move in the slots (which serve as guides for the pins) relative to the levers. This arrangement ensures that the tensioning drum does not assume a misaligned position with respect to the driving drum either during the tensioning step or during operation of the bucket conveyor.

BRIEF DESCRIPTION OF THE DRAWING

FIG. 3 is a sectional view taken along line III—III of FIG. 1.

FIG. 4 is a sectional view taken along line IV—IV of FIG. 1.

FIG. 5 is an enlarged sectional elevational view of the inset A of FIG. 2.

DESCRIPTION OF THE PREFERRED EMBODIMENTS

Turning to FIGS. 1-4, 6 and 7 there are illustrated essential parts of a preferred embodiment of a tensioning device generally designated at 1 and serving for tensioning the carrier C (not shown) of a bucket conveyor. The carrier is, at its outside, provided with buckets (not shown) and is trained about a driving drum rotated by a drive (neither shown) and is further trained about a tensioning drum 2 which is situated at a distance from the driving drum.

Figure 1:
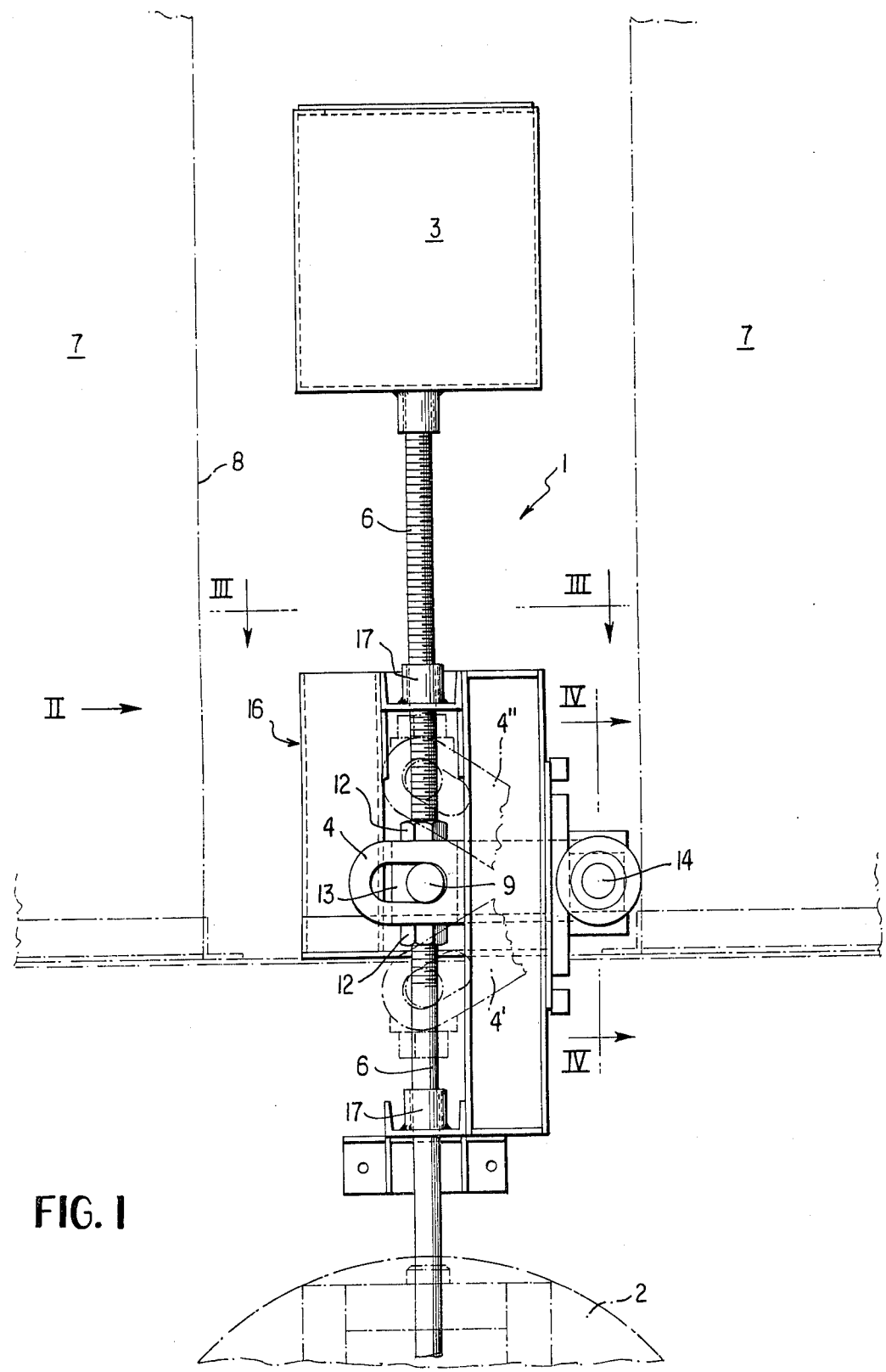
FIG. 1 is a side elevational view of one part of a preferred embodiment of the invention as seen in the direction of arrow I of FIG. 2.

The distance of the tensioning drum 2 from the driving drum which, as viewed in FIG. 1 is situated above the tensioning drum 2 is variable for tensioning the endless bucket carrier. Such an adjustment is effected by means of a tensioning weight 3 which is operatively connected with the drum 2 and which cooperates with two tensioning levers 4 which will be described in further detail as the specification progresses. It is noted that in the side elevational FIG. 1 the lever 4 closer to the observer hides the second lever 4, while in the front elevational FIG. 2 the second lever 4 is at the non-illustrated left side of the device and is thus not shown.

The levers 4 are not connected directly with the tensioning drum shaft 2a but are arranged at a distance therefrom. Each lever 4 is connected directly to a coupling element 6 which is situated between the tensioning weight 3 and the tensioning drum 2. The tensioning weight 3 is situated between the tensioning drum 2 and the non-illustrated driving drum; that is, the tensioning weight 3 is arranged between the two upright bucket ducts 7, whose inner side 8 is visible in FIG. 1.

Figure 2:
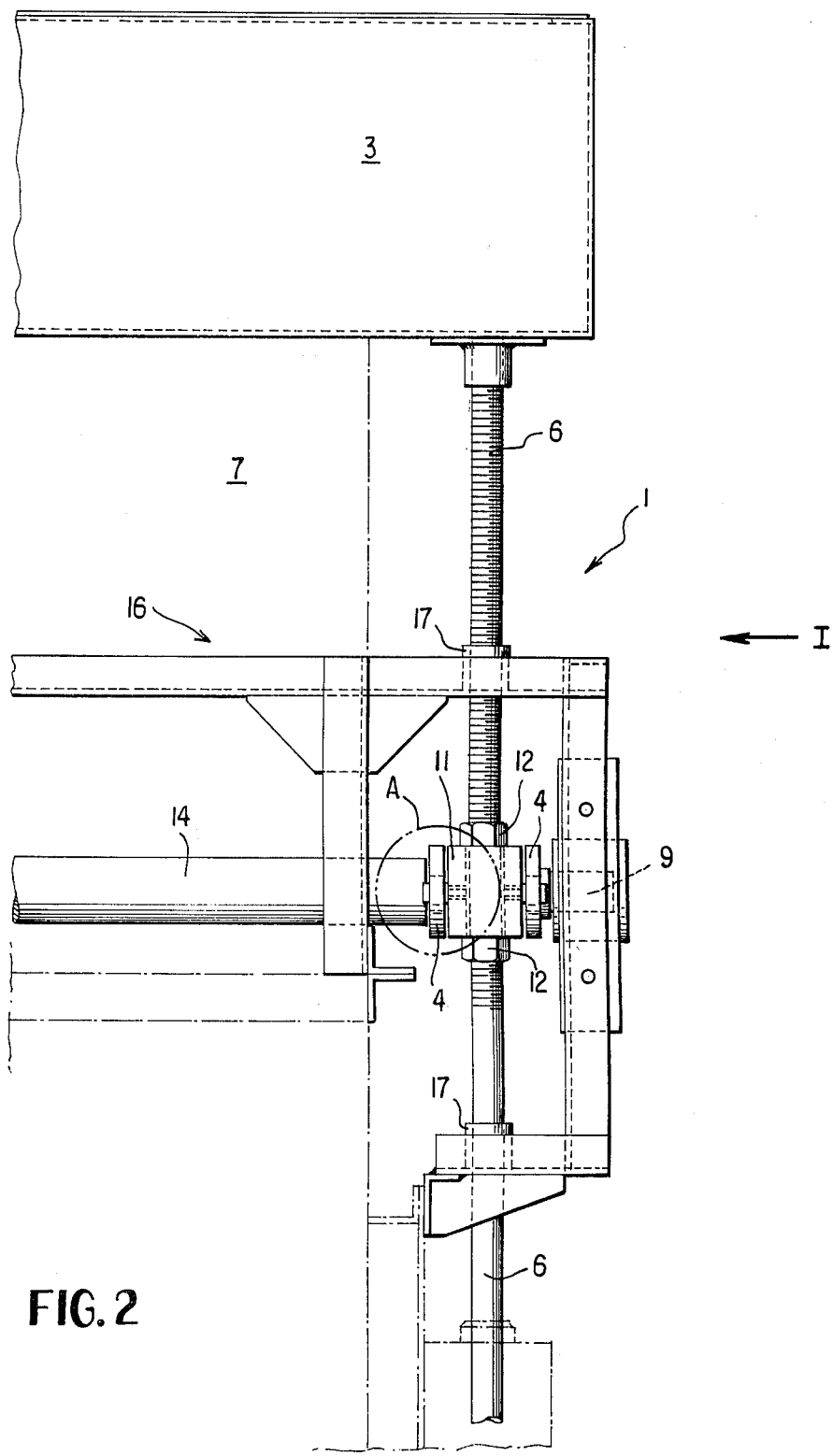
FIG. 2 is a front elevational view of the structure shown in FIG. 1, as seen in a direction of arrow II of FIG. 1.
Figure 6:
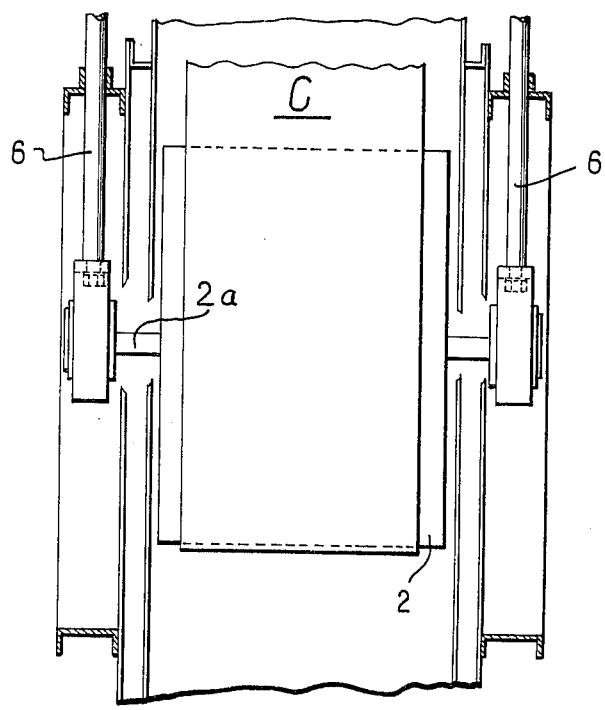
FIG. 6 is a front elevational view of another part of the preferred embodiment shown in FIGS. 1-5.
Figure 7:
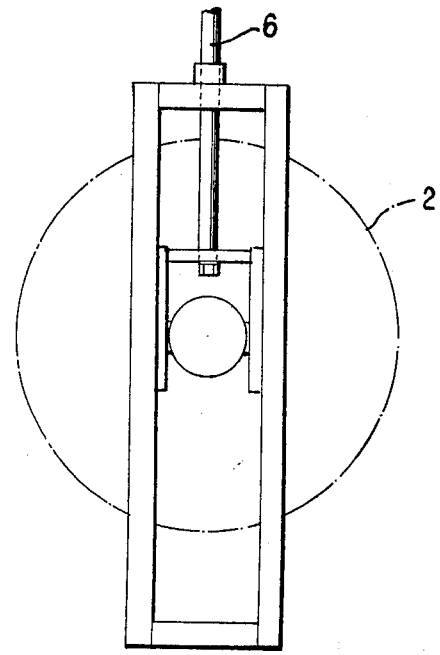
FIG. 7 is a side elevational view of the structure shown in FIG. 6.

The coupling element 6 is, as it may be particularly well seen in FIG. 2, formed as a twin spindle and provided with an external thread which, however, need not extend along the entire length of the coupling element 6. For reasons to be discussed below, it is, however, advantageous, if such external thread extends along the entire length of the coupling element 6. It is noted that FIG. 2 shows one longitudinal half of the tensioning structure which is thus duplicated on the other, non-illustrated side (left side) of the tensioning weight 3, whereby the tensioning device is coupled to both ends of the tensioning drum shaft 2a.

Each coupling element 6 is, in the zone of the associated lever 4, provided with a pin 9 which extends parallel to the axis of the tensioning drum shaft 2a. The pins 9, however, are not mounted directly on the respective coupling element 6 (which, at its outer sides, is provided with a trapezoidal thread), but on a head 11, each closely surrounding the respective coupling element 6 and held in position on its upper and lower side by nuts 12 as seen in FIG. 5.

Each pin 9 extends into a slot 13 of the respective lever 4; the slots 13 extend parallel to the length dimension of the levers 4 in which they are provided.

At those ends which are oriented away from the respective slots 13, the levers 4 are separately coupled to a common lever support shaft 14.

Each coupling element 6 passes through a frame which is generally indicated at 16 and which at its upper and lower portion has aligned bushings 17 serving as guides for the coupling elements 6.

In the description which follows, the operation of the above-described tensioning device will be set forth.

After the tensioning drum 2 and the driving drum as well as the carrier with the buckets are mounted and the tensioning weight 3 becomes effective, so that it exerts a force on the tensioning drum 2 in the tensioning direction with the intermediary of the coupling element 6, the nuts 12 are first loosened to permit a shift of the tensioning drum 2 to such an extent that a predetermined tension is imparted on the bucket carrier. In this condition the levers 4 are, for example, set as illustrated in FIG. 1 with solid lines, that is, the levers 4 extend perpendicularly to the axis of the coupling elements 6. The two levers need not extend exactly parallel to one another. A relative angular relationship between the two levers 4 may be present, particularly when the shaft of the driving drum (not shown) is slightly obliquely positioned. In this manner the shaft of the tensioning drum 2 will be set exactly parallel to the shaft of the driving drum, thus avoiding an improper run of the carrier member about the tensioning drum and the driving drum which may result in the running off of the carrier from the drums. The two levers 4 are each releasably articulated to the lever shaft 14 and may be immobilized with respect to the lever shaft 14 and independently from one another in the aligned position of the tensioning drum 2.

In the above-described aligned position both nuts 12 are tightened to the head 11 so that each coupling element 6 is, with the intermediary of the structural group consisting of the head 11, the nuts 12 as well as the pins 9 connected positively with the levers 4.

If during operation of the bucket conveyor the bucket carrier undergoes further elongation, the levers 4, urged by the weight 3, move into the position 4' shown in dash-dotted lines in FIG. 1. If—for example, because of a reduction of the tensioning weight or a reduction in the load, or the like—the carrier undergoes longitudinal contraction, the levers 4 move upwardly into the position 4" as illustrated in dash-dotted lines in FIG. 1.

In both cases—that is, motion of the levers into either position 4' or 4"—it is ensured that the tensioning drum 2 can move in the direction of alignment with respect to the driving drum, that is, linearly and parallel to a predetermined initial position of the tensioning drum, rather than move in an arcuate path about the lever shaft 14 as has been the case in conventional tensioning devices.

The invention further ensures that even relatively large elongations of the bucket carrier may be taken up. If such function becomes necessary, all that is needed is to loosen the nuts 12 and to set back the levers 4 in a middle position as shown in solid lines in FIG. 1. Such a new position constitutes the new initial position of the tensioning device. It is further seen that the tensioning device according to the invention, by virtue of its construction—in contradistinction to the earlier-described known devices with pivotal levers where the tensioning levers must have a greater length—can be arranged between the two upright tubular ducts. This opens up further possibilities, such as, for example, to install a tensioning device according to the invention, in an already-existing bucket conveyor.

Figure 8:
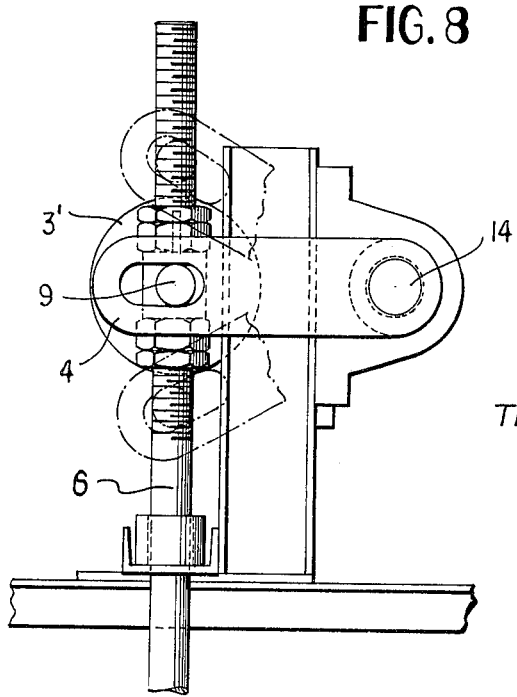
FIG. 8 is a side elevational view of one part of another preferred embodiment of the invention.
Figure 9:
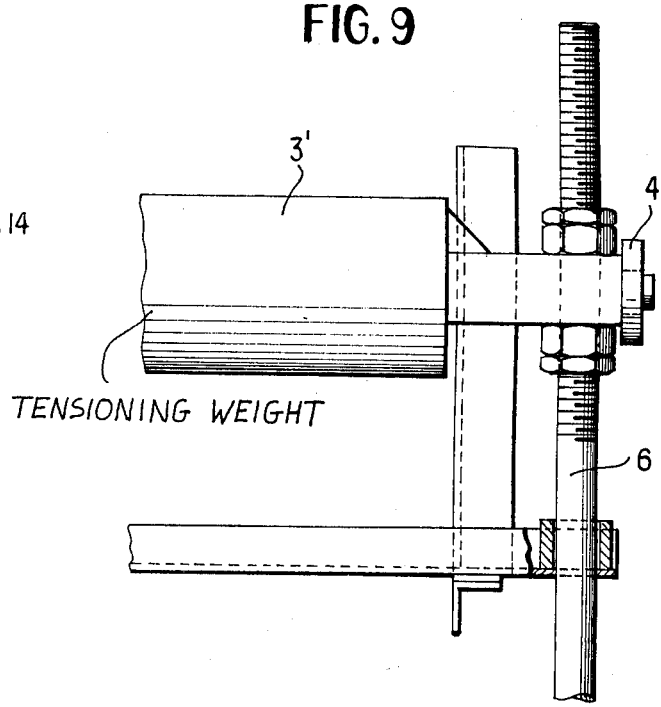
FIG. 9 is a front elevational view of the structure shown in FIG. 8.

Turning now to FIGS. 8 and 9, there is illustrated another preferred embodiment of the invention. In this arrangement the tensioning weight 3' is situated between and in registry with the two levers 4 and simultaneously serves as a coupling member between the levers 4 on the left and the right sides of the tensioning device.

It will be understood that the above description of the present invention is susceptible to various modifications, changes and adaptations, and the same are intended to be comprehended within the meaning and range of equivalents of the appended claims.

What is claimed is:

1. A vertical conveyor comprising
   (a) a driving drum;
   (b) power means for rotating said driving drum;
   (c) a tensioning drum spaced vertically from said driving drum and supported shiftably for varying its distance from said driving drum; said tensioning drum being supported for rotation on a tensioning drum shaft having an axis;
   (d) a vertically oriented endless carrier trained about said driving drum and said tensioning drum;
   (e) a tensioning weight situated spaced from and in vertical alignment with said tensioning drum;
   (f) coupling elements situated between and in vertical alignment with said tensioning weight and said tensioning drum; said coupling elements being secured to said tensioning weight and to said tensioning drum for directly transmitting forces from said tensioning weight to said tensioning drum urging said tensioning drum vertically away from said driving drum, whereby said endless carrier is tensioned;
   (g) a support frame situated between said tensioning weight and said tensioning drum and supporting said coupling elements;
   (h) a support shaft horizontally spaced from said coupling elements; and
   (i) levers mounted on said support shaft and connected to said coupling elements for operatively connecting said support shaft with said coupling elements for equalizing misalignments of said tensioning drum shaft.

2. A vertical conveyor as defined in claim 1, wherein said tensioning weight is arranged between said driving drum and said tensioning drum.

3. A vertical conveyor as defined in claim 1, wherein said coupling elements are separate, spaced coupling elements connecting each said lever to said tensioning drum shaft.

4. A vertical conveyor as defined in claim 3, wherein said levers are arranged substantially perpendicularly to said coupling elements in an initial position.

5. A vertical conveyor as defined in claim 3, further comprising a pin mounted on each said coupling element and being connected to the respective said lever; each said pin having an axis extending parallel to a plane containing the axis of said tensioning drum shaft.

6. A vertical conveyor as defined in claim 5, wherein the axis of each said pin extends parallel to the axis of said tensioning drum shaft.

7. A vertical conveyor as defined in claim 5, wherein each said coupling element comprises a threaded spindle at least in the zone of the respective said lever; and further comprising adjusting nuts threadedly mounted on said threaded spindle on opposite sides of said pin.

8. A vertical conveyor as defined in claim 5, further comprising means for providing a slot in each said lever; each said slot receiving a respective said pin.

9. A vertical conveyor as defined in claim 3, wherein each said coupling element comprises a threaded spindle at least in the zone of the respective said lever.

10. A vertical conveyor as defined in claim 9, wherein each said coupling element comprises aligned twin spindles spaced from one another and having respective opposite ends connected to said tensioning weight and said tensioning drum shaft.

11. A vertical conveyor as defined in claim 1, wherein said support frame has guides through which the threaded spindles pass.

12. A vertical conveyor as defined in claim 1, wherein each lever is individually adjustably attached to said support shaft.

13. A vertical conveyor as defined in claim 1, wherein said tensioning weight is situated between and in registry with said levers; said weight connecting said levers to one another.

* * * * *